United States Patent [19]

Davis

[11] 4,199,666
[45] Apr. 22, 1980

[54] STRAIGHT LINE TELEPHONE DIALER

[76] Inventor: Howard S. Davis, 30 Lantern La., Sharon, Mass. 02067

[21] Appl. No.: 818,406

[22] Filed: Jul. 25, 1977

[51] Int. Cl.² ............................................. H04M 1/31
[52] U.S. Cl. ................................................... 179/90 R
[58] Field of Search .............. 179/90 R, 90 FW, 90 A

[56] References Cited
U.S. PATENT DOCUMENTS

| | | | |
|---|---|---|---|
| D. 145,780 | 10/1946 | Deakin | 179/90 R |
| 1,038,419 | 9/1912 | Nevin | 179/90 R |
| 1,040,389 | 10/1912 | Nevin | 179/90 R |
| 1,257,180 | 2/1918 | Betulander | 179/90 R |
| 2,236,997 | 4/1941 | Feinberg | 179/90 R |
| 2,502,440 | 4/1950 | Deakin | 179/90 R |
| 2,503,542 | 4/1950 | Brander | 179/90 R |
| 2,635,230 | 4/1953 | Madden | 179/90 R |
| 2,888,521 | 5/1959 | Doring | 179/90 R |
| 3,072,749 | 1/1963 | Haussermann | 179/90 R |

FOREIGN PATENT DOCUMENTS 1097946 1/1968 United Kingdom ................. 179/90 R Primary Examiner—Gerald Brigance
Attorney, Agent, or Firm—Wolf, Greenfield & Sacks

[57] ABSTRACT

A straight line dialing mechanism for a telephone employs a movable plate having finger tip accommodating apertures. Initial movement of the plate to an index position causes a spline on the plate to close a switch that short circuits the telephone receiver and winds a spring that supplies the force for return of the plate. Return movement of the plate is controlled by a speed governor. The plate carries a series of nodes which actuate the leaf of a normlly closed switch to momentarily open the switch with the passage of each node in the return of the plate to its initial position. The leaf carries a ratchet head that enables the nodes to pass in the opposite direction without appreciable flexure of the leaf.

3 Claims, 5 Drawing Figures

STRAIGHT LINE TELEPHONE DIALER

FIELD OF THE INVENTION

This invention relates in general to the art of telephony. More particularly, the invention pertains to a mechanism for generating pulsed electrical signals.

BACKGROUND OF THE INVENTION

Until the advent of touch tone signaling by a keyboard having an array of push buttons, nearly all telephones in a system having a large number of subscribers were of the type having a rotary mechanism for generating pulsed electrical signals when a number was dialed. In recent years increased interest has arisen in telephones of unconventional shapes and although a number of such telephones have been marketed, all have used either the rotary dial mechanism or the tone signaling push button keyboard.

OBJECTS OF THE INVENTION

The primary object of the invention is to provide a pulse generating mechanism for a telephone which enables numbers to be dialed by simple straight line motion. A further object is to provide a straight line pulse generating mechanism that is simple in construction and has few parts so that the device can be manufactured at low cost. Another object is to enable the pulse generating mechanism to be very thin so that it can be fastened to a wall without projecting appreciably from the support.

DETAILED DESCRIPTION OF THE PREFERRED EMBODIMENTS

Figure 1:
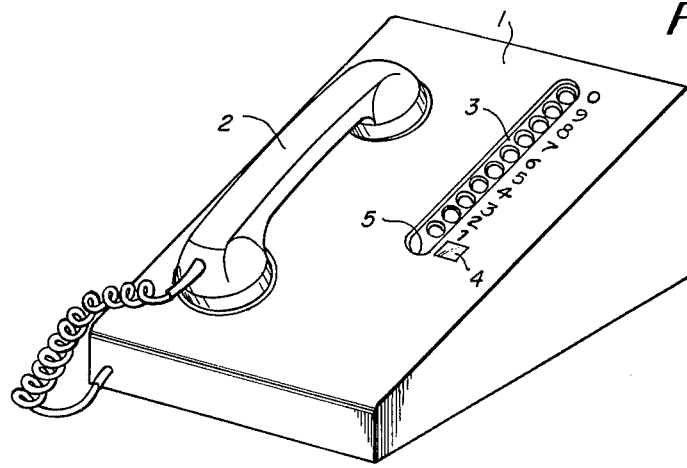
FIG. 1 depicts the invention embodied in a telephone of the type intended to be supported upon the top of a desk or table or other horizontal surface.

A perspective view is shown in FIG. 1 of the invention embodied in a "desk" telephone having an inclined panel 1 in which are wells for housing the mouthpiece and earpiece of a standard telephone receiver-transmitter handset 2. The hook switch for the telephone is preferably in one of the wells. Disposed below a slot in the inclined panel is a slidable member 3 having a row of holes for the acceptance of a finger tip. On the panel adjacent the row of holes in the slidable member is a row of numerals covering the decade from ten to one, with ten being represented simple by the numeral zero. Immediately below the row of numerals is a window 4 in the panel. On inserting a finger tip into one of the holes and pulling the slidable member down until the finger reaches the bottom of the slot 5 in the panel, the number being "dialed" appears in the window. That number corresponds with the number that appeared beside the selected hole when the slidable member was in its uppermost position. Upon release of the slidable member when the finger reaches the bottom of the slot, the slidable member returns to its initial position and generates pulse signals as it returns.

Figure 2:
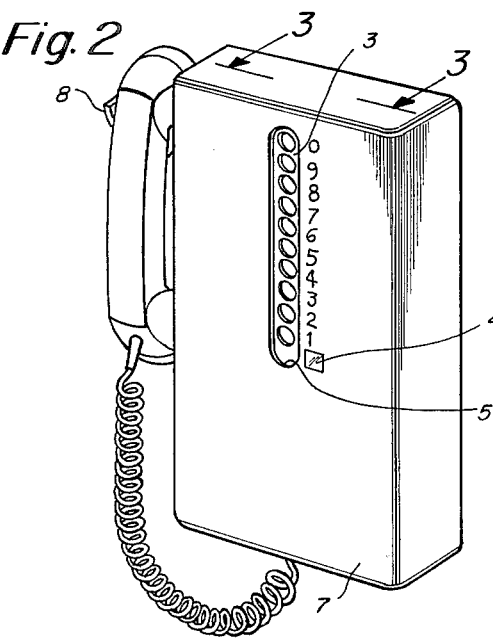
FIG. 2 depicts the invention embodied in a telephone of the type that is secured to a wall or other vertical support.

The wall telephone embodiment shown in FIG. 2 has a vertical panel 7 and the handset is hung on a hook switch 8. Otherwise in construction and operation that embodiment is similar to the FIG. 1 desk embodiment. The wall unit can, in fact, be very thin and, as the description proceeds, it will be seen that the straight line pulse generating mechanism is arranged to be very compact.

Figure 3:
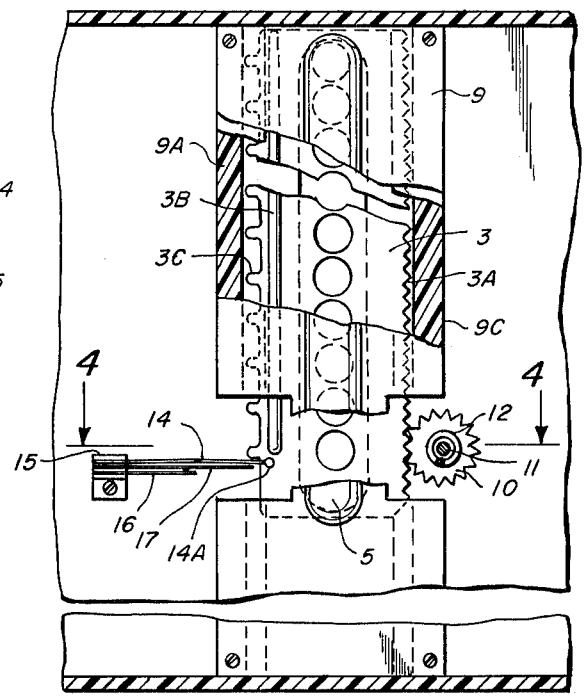
FIG. 3 is a sectional view taken along the parting plane 3—3 of FIG. 1 and shows a bottom plan view of the preferred embodiment of the invention with parts broken away to expose the mechanical arrangement.
Figure 4:
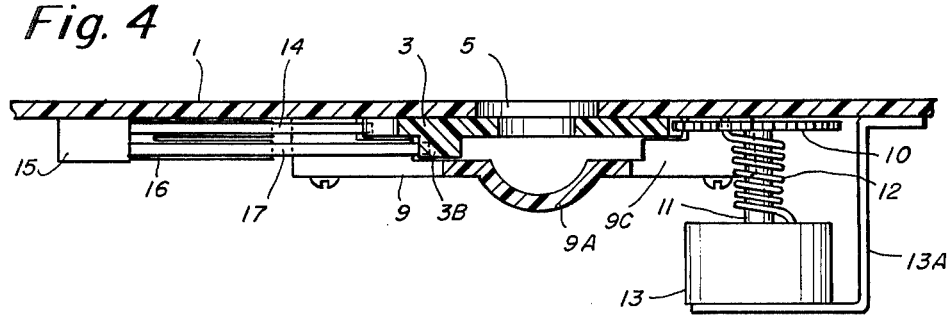
FIG. 4 is a sectional view of the preferred embodiment taken along the parting plane 4—4 in FIG. 3.

Referring now to FIGS. 3 and 4, the slidable member 3 is disposed between the panel 1 and a guard plate 9 having a trough 9A extending the length of the slot 5 in the panel. The trough 9A limits the extent to which a finger can be pushed through a hole in the slidable plate. The slidable member 3 is essentially a flat plate that is perforated to provide the row of finger holes. As shown in FIG. 3, the right hand edge of the slidable member is provided with teeth 3A that are engaged by a pinion gear 10 fixed to a shaft 11 which is surrounded by a spring 12. On pulling the movable member 3 down to "dial" a number, the spring, which has one end fixed to the pinion 10 and its other end fixed to the housing of a governor 13, is wound. On release of the slidable member, the spring unwinds and causes the pinion to rotate in the direction causing the slidable member to return to its initial position. The speed at which the slidable palte returns to its initial position is controlled by the governor 13 whose mechanism in the housing is connected to the shaft 11. The housing of the governor is secured to a bracket 13A that is fastened to the panel 1 or some other stationary part of the telephone apparatus. The governor's mechanism is not here described because conventional governors exist which can adequately serve in the FIG. 4 embodiment.

The slidable plate 3 carries an integral spline 3B which extends longitudinally along the plate and is situated to actuate a switch when the slidable plate 3 is pulled down. On being pulled down, spline 3B forces the leaf 14 of a normal open switch down and causes the switch to close so that the telephone receiver is short circuited while the number is being "dialed". That action prevents the generated pulses from being heard through the receiver. The leaf 14 can, if desired, carry a roller 14A at its end to enable it to roll along the spline as the plate 3 moves. When the plate returns to its initial position, the leaf 14 resumes its normally open switch position. The leaf 14 at its end that is remote from the spline is held in an insulative block 15. Beneath the leaf 14 and insulated from it by the block 15 is a leaf 16 of the normally open switch.

The left hand edge of the slidable plate 3 carries a series of nodes 3C which, as depicted in FIGS. 3 and 4, are in front of and to the left of the spline 3B. As the slidable plate 3 is pulled down, the nodes encounter a ratchet pawl 18 that is pivotally mounted at the tip of a leaf 17 of a normally closed switch. The ratchet pawl is arranged to hinge downwardly to allow the nodes to pass as the plate is pulled down. On the return upwardly of the slidable plate, the nodes engage the pawl 18 and lift the leaf 17 to open the switch. Consequently, each node causes a momentary break in the normally closed switch as the node passes upwardly past the leaf 17. The farther down the slidable plate is pulled, the more pulses are generated as the plate returns to its initial position.

The nodes 3C are regularly spaced along the edge of the slidable plate in a manner permitting the maximum time for the plate to get up to speed before the first break is made by a node. That is, when the finger is at the bottom of the slot 5 in the panel, to enable the plate to have the maximum time to reach the proper speed for generating pulses at the required rate upon the return of the plate, the leaf 17 is situated to be immediately below the node next above the node which is to make the first break. That holds true for all numbers except the number zero which, because it is the topmost number, has its node at the top of the slidable plate. When the number zero is "dialed", the leaf 17 will therefore be the proper distance above the topmost node to enable the plate to get up to speed before the first break is made.

The leaf 17 normally is in contact with the leaf 16 that is supported on the insulative block 15 and is situated below the leaf 17. Consequently leaf 17 and leaf 16 constitute a normally closed switch that is momentarily opened by each node that passes the leaf 17 on the return of the slidable plate to its initial position. The leaf 16, as shown in FIG. 4, has two side by side blades which can flex independently so that the motion of leaf 14 does not affect leaf 17 and vice versa.

For smooth operation, the slidable plate 3 should be confined to straight up and down motion without appreciable lateral "play". That is accomplished by providing the guard plate with longitudinally extending side members 9B and 9C that laterally confine the slidable plate. Those side members are cut away as shown in FIG. 3, to enable the pinion 10 to engage teeth 3A, to enable leaf 14 to be engaged by the spline 3B, and to enable leaf 17 to be engaged by the nodes 3C.

Figure 5:
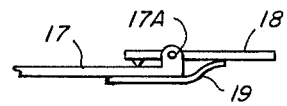
FIG. 5 shows the preferred arrangement of the ratchet pawl on the tip of the leaf spring of the normally closed switch.

Leaf spring 17 must not oscillate or "bounce" sufficiently to open the normally closed switch when the slidable plate 3 is pulled down. To prevent the normally closed switch from opening when the plate is pulled down, the tip of spring 17, as depicted in FIG. 5, carries the ratchet pawl 18 in a manner permitting the pawl to pivot and allow the nodes 3C on plate 3 to pass downwardly. Each node, as it moves downwardly and meets the ratchet pawl 18, causes that pawl to pivot and allow the node to pass. A leaf spring 19, secured to leaf 17, restores the pawl to its original position after the passage of each node. The pawl 18 is pivotally mounted between a pair of ears 17A at the tip of leaf 17 and the pawl has a rearward extension 18A that sits on the leaf 17 to limit the pivotal movement of the pawl when it is restored by the force of spring 19. Upon the slidable plate 3 moving upwardly, as each node encounters the pawl 18, the node lifts the pawl and leaf 17 and causes the normally closed switch to open for a brief interval until the node has moved upwardly enough to disengage from the pawl. Upon disengagement, leaf spring 17 returns to its normal position and enables the pawl to then be engaged by the next upwardly moving node on plate 3.

To permit the pulse generating mechanism to be made thinner, the governor 13 can be placed closer to the panel 1. In that location, the shaft 11 is then considerably shorter. The spring 12 can be disposed inside the governor housing and be arranged to be wound by rotation of shaft 11 or a drive gear can be provided that meshes with pinion 10 and winds a spring when the gear is turned in one direction by the pinion. The wound spring can then drive the pinion in the opposite direction when the sliding plate 3 is released after being pulled down to "dial" a number. The pulse generating mechanism can be constructed to be very thin and not protrude appreciably from any surface to which it is secured.

Because changes can be made in the illustrated embodiment that do not alter the essential nature of the invention, it is intended that the scope of the invention be delimited by the appended claims and include such structures as do not in essence depart from the defined domain.

I claim:
1. A telephone signaling mechanism comprising
   (1) a panel having an elongate opening,
   (2) a plate having a plurality of spaced apertures therein, each aperture being adapted to admit a finger tip,
   (3) means mounting the plate for rectilinear sliding movement relative to the panel with the plurality of spaced apertures accessible through the elongate opening when the plate is in an initial position,
   (4) a series of regularly spaced nodes on the plate aligned in the direction of sliding movement of the plate,
   (5) means for restoring the plate to its initial position along a rectilinear path,
   (6) a normally open switch,
   (7) means on the plate for causing the normally open switch to close upon movement of the plate away from its initial position,
   (8) a normally closed switch having a resilient arm carrying pivoted means extending into the path of the nodes of the plate for engagement by each passing node, the pivoted means causing the normally closed switch to be momentarily opened upon the passage of each node in the direction to restore the plate to its initial position and enabling the nodes to pass in the opposite direction without appreciable flexure of the resilient arm,
   (9) a pinion gear,
   (10) a governor for controlling the speed at which the plate is restored to its initial position, the governor being connected to the pinion gear,
   (11) and a rack on the slidable plate having its teeth in mesh with the teeth of the pinion gear.

2. The telephone signaling mechanism according to claim 1, wherein
   the series of regularly spaced nodes protrude from one edge of the plate and the teeth of the rack protrude from the opposite edge of the plate.

3. The telephone signaling mechanism according to claim 3, wherein
   the means on the plate for causing the normally open switch to close upon movement of the plate away from its initial position is an elongate spline on the plate extending longitudinally in the direction of rectilinear movement of the plate.

* * * * *